United States Patent
Xie et al.

(10) Patent No.: US 11,193,053 B2
(45) Date of Patent: Dec. 7, 2021

(54) WAX INHIBITORS FOR OIL COMPOSITIONS AND METHODS OF USING WAX INHIBITORS TO REDUCE WAX DEPOSITION FROM OIL

(71) Applicant: BL Technologies, Inc., Minnetonka, MN (US)

(72) Inventors: Xiaoan Xie, Shanghai (CN); Wenqing Peng, Shanghai (CN); Kelly Scott Chichak, Niskayuna, NY (US)

(73) Assignee: BL Technologies, Inc., Minnetonka, MN (US)

( * ) Notice: Subject to any disclaimer, the term of this patent is extended or adjusted under 35 U.S.C. 154(b) by 54 days.

(21) Appl. No.: 16/497,054

(22) PCT Filed: Dec. 27, 2017

(86) PCT No.: PCT/US2017/068460
§ 371 (c)(1),
(2) Date: Sep. 24, 2019

(87) PCT Pub. No.: WO2018/190917
PCT Pub. Date: Oct. 18, 2018

(65) Prior Publication Data
US 2020/0377785 A1 Dec. 3, 2020

(30) Foreign Application Priority Data
Apr. 13, 2017 (CN) .......................... 201710240505.9

(51) Int. Cl.
| | |
|---|---|
| C08F 210/14 | (2006.01) |
| C09K 8/524 | (2006.01) |
| C08F 222/06 | (2006.01) |
| C08F 8/14 | (2006.01) |
| F17D 1/16 | (2006.01) |

(52) U.S. Cl.
CPC ............... *C09K 8/524* (2013.01); *C08F 8/14* (2013.01); *C08F 210/14* (2013.01); *C08F 222/06* (2013.01); *C08F 2810/50* (2013.01); *F17D 1/16* (2013.01)

(58) Field of Classification Search
CPC .......... C09K 8/524; C08F 8/14; C08F 210/14; C08F 222/06; C08F 2810/50; C08F 222/14; C08F 222/16; C08F 2800/20; C08F 8/12; F17D 1/16; C08G 81/021; C10M 2209/086; C10M 145/16; C10N 2030/04; C10N 2030/02; C08L 23/20; C08L 23/24; C08L 35/00; C08L 35/06; C08L 35/02
See application file for complete search history.

(56) References Cited

U.S. PATENT DOCUMENTS

| | | |
|---|---|---|
| 2,892,793 A | 6/1959 | Stewart |
| 2,977,334 A | 3/1961 | Zopf |
| 3,449,236 A | 6/1969 | Engelhart |
| 3,449,250 A | 6/1969 | Fields |
| 3,694,176 A | 9/1972 | Miller |
| 3,854,893 A | 12/1974 | Rossi |
| 3,966,428 A | 6/1976 | Rossi |
| 3,984,368 A | 10/1976 | Teer et al. |
| 4,151,069 A | 4/1979 | Rossi |
| 4,166,900 A | 9/1979 | Heimsch et al. |
| 4,171,273 A | 10/1979 | Waldbillig et al. |
| 4,240,916 A | 12/1980 | Rossi |
| 4,261,703 A | 4/1981 | Tack et al. |
| 4,514,314 A | 4/1985 | Rossi |
| 4,548,725 A | 10/1985 | Bridger |
| 4,693,838 A | 9/1987 | Varma et al. |
| 4,839,074 A | 6/1989 | Rossi et al. |
| 4,861,818 A | 8/1989 | Timmerman et al. |
| 4,871,823 A | 10/1989 | Billman et al. |
| 4,891,145 A | 1/1990 | Brod et al. |
| 4,900,461 A | 2/1990 | Ver Strate et al. |
| 4,954,572 A | 9/1990 | Emert et al. |
| 5,041,622 A | 8/1991 | LeSuer |

(Continued)

FOREIGN PATENT DOCUMENTS

| | | |
|---|---|---|
| CN | 1037854 C | 12/1989 |
| CN | 1064305 A | 9/1992 |

(Continued)

OTHER PUBLICATIONS

International Search Report and Written Opinion in related International Application No. PCT/US2017/068460 dated May 8, 2018; 12 pages.

(Continued)

*Primary Examiner* — Robert C Boyle
(74) *Attorney, Agent, or Firm* — Armstrong Teasdale LLP

(57) ABSTRACT

An oil composition includes an oil and an effective amount of a wax inhibitor that includes at least one modified alpha-olefin maleic anhydride copolymer of the formula:

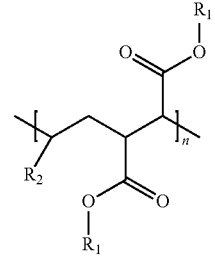

wherein R1 is selected from hydrogen or hydrocarbyl groups containing 12-60 carbon atoms and an average carbon atom number of R1, if not hydrogen, in the copolymer is in a range from 20 to 32, R2 is selected from hydrocarbyl groups containing 6-12 carbon atoms, and n is a number of repeating units ranging from 1 to 100.

13 Claims, No Drawings

(56) References Cited

U.S. PATENT DOCUMENTS

| | | | |
|---|---|---|---|
| 5,366,649 A | 11/1994 | Durand et al. | |
| 5,441,545 A | 8/1995 | Lewtas et al. | |
| 5,703,023 A * | 12/1997 | Srinivasan | C10M 145/16 |
| | | | 508/468 |
| 5,792,729 A | 8/1998 | Harrison et al. | |
| 5,857,287 A | 1/1999 | Schield et al. | |
| 6,015,863 A | 1/2000 | Mike et al. | |
| 6,174,843 B1 * | 1/2001 | Peyton | C10M 145/16 |
| | | | 508/468 |
| 6,475,963 B1 | 11/2002 | Bloch et al. | |
| 6,715,473 B2 | 4/2004 | Ritchie et al. | |
| 7,067,599 B2 | 6/2006 | Tack et al. | |
| 7,144,951 B2 | 12/2006 | Duyck et al. | |
| 7,198,103 B2 | 4/2007 | Campbell | |
| 7,500,522 B2 | 3/2009 | Skibinski et al. | |
| 7,745,541 B2 | 6/2010 | Ruhe, Jr. et al. | |
| 7,816,309 B2 | 10/2010 | Stokes et al. | |
| 7,820,604 B2 | 10/2010 | Ruhe, Jr. et al. | |
| 7,820,605 B2 | 10/2010 | Stokes et al. | |
| 7,833,955 B2 | 11/2010 | Burrington et al. | |
| 7,858,566 B2 | 12/2010 | Ruhe, Jr. et al. | |
| 7,928,044 B2 | 4/2011 | Stokes et al. | |
| 7,942,941 B2 | 5/2011 | Cravey et al. | |
| 8,067,347 B2 | 11/2011 | Ruhe, Jr. et al. | |
| 8,455,568 B2 | 6/2013 | Ruhe, Jr. | |
| 8,557,753 B2 | 10/2013 | Gieselman et al. | |
| 2004/0101775 A1 | 5/2004 | Yoshihiro et al. | |
| 2004/0110647 A1 * | 6/2004 | Gapinski | C10M 157/04 |
| | | | 508/468 |
| 2005/0124509 A1 | 6/2005 | Gutierrez et al. | |
| 2010/0130385 A1 | 5/2010 | Guzmann et al. | |
| 2011/0190438 A1 | 8/2011 | Gonzalez et al. | |
| 2013/0186629 A1 | 7/2013 | Leonard et al. | |
| 2013/0310290 A1 | 11/2013 | Price et al. | |
| 2014/0048273 A1 | 2/2014 | Southwick et al. | |
| 2014/0250771 A1 | 9/2014 | Biggerstaff et al. | |
| 2014/0260567 A1 | 9/2014 | Fouchard et al. | |
| 2016/0115369 A1 * | 4/2016 | Soriano, Jr. | C09K 8/524 |
| | | | 507/90 |

FOREIGN PATENT DOCUMENTS

| | | |
|---|---|---|
| CN | 1965064 A | 5/2007 |
| CN | 100439404 C | 12/2008 |
| CN | 101381640 B | 3/2009 |
| CN | 101544735 A | 9/2009 |
| CN | 101668828 A | 3/2010 |
| CN | 101812348 B | 8/2010 |
| CN | 101870750 A | 10/2010 |
| CN | 101899162 A | 12/2010 |
| CN | 101921377 A | 12/2010 |
| CN | 102108292 A | 6/2011 |
| CN | 102191093 A | 9/2011 |
| CN | 102382695 A | 3/2012 |
| CN | 102533241 B | 7/2012 |
| CN | 103450955 B | 12/2013 |
| CN | 103642477 A | 3/2014 |
| CN | 104245906 A | 12/2014 |
| CN | 104371058 A | 2/2015 |
| CN | 104693344 A | 6/2015 |
| CN | 104694181 A | 6/2015 |
| EP | 172906 B2 | 12/1992 |
| EP | 677572 B1 | 1/1999 |
| EP | 1746147 A1 | 1/2007 |
| JP | S62003200 B2 | 1/1987 |
| JP | 02919861 B2 | 7/1999 |
| JP | 2008308660 A | 12/2008 |
| JP | 2011122135 A | 6/2011 |
| JP | 05356971 B2 | 12/2013 |
| WO | 2008125588 A1 | 10/2008 |
| WO | 2011079508 A1 | 7/2011 |
| WO | 2014165532 A1 | 10/2014 |

OTHER PUBLICATIONS

International Search Report and Written Opinion in related International Application No. PCT/CN2018/082088 dated Jul. 11, 2018; 9 pages.
"Octadecylsuccinic acid | C22H42O4", PubChem Compound, Aug. 8, 2005, NCBI Database accession No. CID 110691, XP002801616, Retrieved from the Internet: URL: https://pubchem.ncbi.nlm.nih.gov/compound/110691.
"UNILIN Alcohols", Web Article, 2011, Baker Hughes Incorporated, 2 pages.
Xing Shili et al.: "Effect of Maleic Anhydride Copolymer on Cold Flow Ability of Waxy Oils", Jun. 2011, Chinese Journal of Colloids and Polymers, vol. 29, No. 2, DOI: 10.3969/j.issn.1009-1815.2011.02.010. English abstract only.
Extended European Search Report for European Application No. 18783759.6, dated Feb. 16, 2021, 7 pages.

* cited by examiner

WAX INHIBITORS FOR OIL COMPOSITIONS AND METHODS OF USING WAX INHIBITORS TO REDUCE WAX DEPOSITION FROM OIL

CROSS REFERENCE TO RELATED APPLICATION

This application claims the priority benefit of Chinese Patent Application Serial No. 201710240505.9 filed Apr. 13, 2017.

BACKGROUND

The present disclosure relates generally to modified alpha-olefin maleic anhydride copolymers useful as wax inhibitors in oils, their use for reducing wax deposition from oils, and methods for their manufacture.

In production of most wax-containing oils such as crude oils, a major problem occurs when the oil temperature is below the solidification temperature of the wax in the oil, because the wax solidifies and tends to precipitate out and deposit on the piping and other equipment contacted by the oil. Build-up of wax deposits can impact oil production throughput due to reduced effective pipe diameter, also associate with accelerated corrosion. Moreover, wax deposition may cause the oil to lose its ability to flow, and thus cause difficulties in transporting the oil through lines and pumps.

Comb polymers are widely used as wax inhibitors and pour point depressants in oil production and transportation to reduce wax deposit amount and/or improve crude flowability at temperatures below wax appearance temperature.

Deepwater offshore oil production is growing fast due to the limitation and aging of onshore oil fields. Additives used in the deepwater oil production need to be stable at low temperature (for example, at about 4° C.) and high pressure (for example, higher than 10,000 psi) to make sure they will not block the umbilical pipe. There are a few deepwater wax inhibitors that are designed with good low temperature and high pressure stability by sacrificing parts of the wax inhibiting performance. However, these wax inhibitors have narrower crude envelop, and thus they can only treat limited crudes containing low carbon number (Cn) wax. There is no effective wax inhibitors with good low temperature stability as well as wider crude envelop, for example, which are applicable for deepwater crudes containing higher Cn wax.

Therefore, it is desirable to provide effective and economical additives that can be employed in the deepwater oil production as wax inhibitors.

BRIEF DESCRIPTION

In one aspect, an oil composition includes an oil and an effective amount of a wax inhibitor that includes at least one modified alpha-olefin maleic anhydride copolymer of the formula:

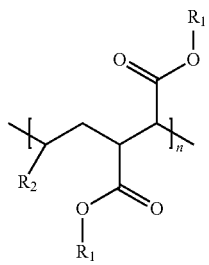

wherein R1 is selected from hydrogen or hydrocarbyl groups containing 12-60 carbon atoms and an average carbon atom number of R1, if not hydrogen, in the copolymer is in a range from 20 to 32, R2 is selected from hydrocarbyl groups containing 6-12 carbon atoms, and n is a number of repeating units ranging from 1 to 100.

In another aspect, a method of reducing wax deposition from an oil includes adding to said oil an effective amount of a wax inhibitor that includes at least one modified alpha-olefin maleic anhydride copolymer of the formula:

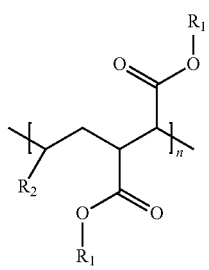

wherein R1 is selected from hydrogen or hydrocarbyl groups containing 12-60 carbon atoms and an average carbon atom number of R1, if not hydrogen, in the copolymer is in a range from 20 to 32, R2 is selected from hydrocarbyl groups containing 6-12 carbon atoms, and n is a number of repeating units ranging from 1 to 100.

In another aspect, an oil composition includes an oil and an effective amount of a wax inhibitor. The wax inhibitor is prepared by reacting an alpha-olefin containing from 8 to 14 carbon atoms with maleic anhydride in the presence of a free radical initiator to obtain a high molecular weight copolymer, followed by reacting said high molecular weight copolymer with an alcohol mixture with an average number of carbon atoms in a range from 20 to 32.

In yet another aspect, a method of reducing wax deposition in an oil includes adding to said oil an effective amount of a wax inhibitor. The wax inhibitor is prepared by reacting an alpha-olefin containing from 8 to 14 carbon atoms with maleic anhydride in the presence of a free radical initiator to obtain a high molecular weight copolymer, followed by reacting said high molecular weight copolymer with an alcohol mixture with an average number of carbon atoms in a range from 20 to 32.

DETAILED DESCRIPTION

One or more embodiments of the present disclosure will be described below. Unless defined otherwise, technical and scientific terms used herein have the same meaning as is commonly understood by one of skill in the art to which this invention belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean any, some, or all of the listed items. The use of "including," "comprising" or "having" and variations thereof herein are meant to encompass the items listed thereafter and equivalents thereof as well as additional items.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. Additionally, when using an expression of "about a first value—a second value," the about is intended to modify both values. In at least some instances, the approximating language may correspond to the precision of an instrument for measuring the value. Here, and throughout the specification and claims, range limitations may be combined and/or interchanged, such ranges are identified and include all the sub-ranges contained therein unless context or language indicates otherwise.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Embodiments of the present invention generally relate to a wax inhibitor composition that is used as an additive in oil production and transportation for reducing wax deposition and providing oils with improved low temperature flow properties. Further, embodiments of the present invention also relate to an oil composition including an oil and an effective amount of the aforementioned wax inhibitor additive and/or additive concentrate, and a method of improving low temperature flow properties of oils by adding an effective amount of the aforementioned wax inhibitor additive and/or additive concentrate into the oil.

The wax inhibitor composition includes at least one modified alpha-olefin maleic anhydride (AOMA) copolymer as described hereinafter. It is found in the present disclosure that, as for the modified AOMA copolymer used as a wax inhibitor, the hydrocarbyl side chain (from the olefin for synthesizing the copolymer) is more critical to low temperature stability whereas the ester side chain (from the alcohols for synthesizing the copolymer) is more critical to wax inhibiting performance. A modified AOMA copolymer that includes a relatively short hydrocarbyl side chain and a relatively long ester side chain can achieve a balance of both good wax inhibiting performance and low temperature stability. For example, a modified AOMA copolymer that includes a hydrocarbyl side chain containing 6-12 carbon atoms and an ester side chain having an average carbon atom number in a range from 20 to 32 carbon atoms have both good wax inhibiting performance and low temperature stability, and is particularly applicable in deepwater oil production and transportation, as a wax inhibitor.

In some embodiments, a wax inhibitor composition of the present invention includes at least one modified AOMA copolymer of the formula:

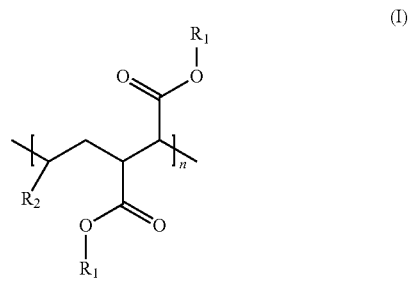

wherein $R_1$ is selected from hydrogen or hydrocarbyl groups containing 12-60 carbon atoms and an average carbon atom number of the $R_1$, if not hydrogen, in the modified AOMA copolymer is in a range from 20 to 32, $R_2$ is selected from hydrocarbyl groups containing 6-12 carbon atoms, and n is the number of repeating units ranging from 1 to 100.

Specifically, $R_1$ in the formula (I) may be hydrogen or an ester side chain containing 12-60 carbon atoms, depending on whether the esterification occurs at the carboxy group. "$R_1$"s at different carboxy groups of the modified AOMA copolymer may be the same or different. Similarly, $R_2$ in the formula (I) may be a hydrocarbyl side chain containing 6-12 carbon atoms, and "$R_2$"s in different repeating units of the formula (I) may be the same or different, depending on how many kinds of alpha-olefins are used in synthesis of the modified AOMA copolymer.

As used herein the term "hydrocarbyl" refers to any combination of straight-chain, branched-chain, or cyclic alkyl, alkenyl, alkynyl, aryl groups, or the respective group substituted with one or more substituents, including, but not limited to, groups such as alkyl, alkenyl, alkynyl, aryl, cycloalkyl groups and any combination thereof.

In some embodiments, R1 is a C12-C60 saturated or unsaturated substituted or unsubstituted alkyl group. In some embodiments, R2 is a C6-C12 saturated or unsaturated substituted or unsubstituted alkyl group. In some embodiments, n is an integer of from 1 to 50. In some specific embodiments, n is an integer of from 5 to 30.

In some embodiments, the modified AOMA copolymer is a copolymer of an alpha-olefin with a relatively short alkyl chain and maleic anhydride modified with relatively long alkyl chain alcohols, which is generally prepared by reacting an alpha-olefin with maleic anhydride in the presence of a free radical initiator such as, for example, tert-butyl peroxybenzoate (other free radical initiators useful in the context of the present invention are known to those skilled in the art) in order to form a high molecular weight copolymer, and then reacting the high molecular weight copolymer with an alcohol mixture in order to form the compound of formula (I).

In some embodiments, the alpha-olefin is a C8-C14 alpha-olefin, such as 1-octene, 1-decene, 1-dodecene, or 1-tetradecene. In some specific embodiments, the alpha-olefin is 1-dodecene.

In some embodiments, the alcohol mixture refers to a C12-C60 alcohol blend with an average number of carbon atoms in a range from 20 to 32. Each of alcohols in the alcohol mixture contains 12-60 carbon atoms, while the alcohols in the alcohol mixture are proportioned to make the alcohol mixture have an average number of carbon atoms in the range from 20 to 32. In some specific embodiments, more than 30% by weight of alcohols in the alcohol mixture are C22+ alcohols that contain at least 22 carbon atoms.

In some embodiments, the alcohol mixture includes at least one C12-C60 alcohol blend. In some embodiments, the alcohol mixture includes at least two C12-C60 alcohol blends. In some embodiments, the alcohol mixture includes at least one C12-C60 alcohol blend and at least one bulky alcohol. Examples of suitable C12-C60 alcohol blends include but are not limited to NAFOL20+, NAFOL24+, NAFOL2428, Unilin 350 and Unilin 425, compositions of which will be described hereinafter in Examples. In some embodiments, the alcohol mixture may include NAFOL20+, NAFOL24+ and optionally at least one bulky alcohol. In some embodiments, the alcohol mixture may include NAFOL20+ and NAFOL2428. In some embodiments, the alcohol mixture may include Unilin 350. In some embodiments, the alcohol mixture may include Unilin 425 and at least one bulky alcohol. As used herein, the term "bulky alcohol" refers to an alcohol that is sterically more bulky than the other alcohol(s) in the alcohol mixture. Examples of bulky alcohols include a guerbet alcohols (such as 2-decyl-1-tetradecanol), benzyl alcohols, oleyl alcohols, tertiary alcohols, t-butyl alcohol, adamantanol, trimethylsilanol, and derivatives thereof.

The high molecular weight copolymer may be made by any of the methods known in the art, e.g., by solution polymerization with free radical initiation. For example, in some embodiments, the modified AOMA copolymer is synthesized from alternating free radical copolymerization of 1-dodecene and maleic anhydride, then modified with a selected alcohol mixture to make alkyl side chains on the polymer backbone through ester group.

In some embodiments, about 1 to 5 moles of alpha-olefin are employed for each mole of maleic anhydride employed in the synthesis. In some embodiments, about 0 to 2 moles or preferably about 1 to 2 moles of mixed alcohols are employed for each mole of maleic anhydride employed in the synthesis. For example, 0.5 moles of a first alcohol mixture and 0.5 moles of a second alcohol mixture may be employed for each mole of maleic anhydride in order to get the copolymer of formula (I).

The modified AOMA copolymers as described herein have good wax inhibiting performance and low temperature stability and can be used as wax inhibitors and pour point depressants in oil production and transportation. With the balanced performance and low temperature stability, the copolymers are particularly applicable as wax inhibitors for deepwater crude oil, for example, deepwater crude oil having a wax content of 0.1% to 100%, or preferably 1% to 50% by weight, measured by high temperature gas chromatography.

In some embodiments, the oil may be added with 0.0001% (1 ppm) to 1% (10000 ppm), or preferably 0.001% to 0.5% by weight of the wax inhibitor in order to effectively inhibit wax deposition and improve flowability.

The embodiments of the present disclosure are demonstrated with reference to non-limiting examples. The following examples are set forth to provide those of ordinary skill in the art with a detailed description of how the materials claimed herein are made, used and evaluated, and are not intended to limit the scope of what the inventors regard as their invention. Unless specified otherwise, all of the materials or components are commercially available from common chemical suppliers.

Examples 1-11

Several kinds of commercial alcohol blends were used in the following examples. NAFOL20+ is an aliphatic C18-C26 alcohol blend purchased from SASOL, which includes typically 6% C18, 46% C20, 29% C22, 14% C24, and 5% C26 by weight. NAFOL24+ is an aliphatic C20-C30 alcohol blend purchased from SASOL, which includes typically 2.3% C20, 7.4% C22, 30.1% C24, 31.8% C26, 22.4% C28, and 5.2% C30 by weight. ISOFOL24 is 2-decyl-1-tetradecanol purchased from SASOL.

NAFOL2428 is an aliphatic C20-C30 alcohol blend purchased from SASOL, which includes typically <5% C20, <10% C22, 30-50% C24, 30-50% C26, 10-20% C28, and <5% C30 by weight.

Unilin350 is an aliphatic C14-C50 alcohol blend purchased from Baker Hughes, which includes typically 5.5% C14, 7.6% C16, 8.3% C18, 9.0% C20, 9.8% C22, 9.7% C24, 9.3% C26, 8.4% C28, 7.3% C30, 6.4% C32, 5.1% C34, 3.9% C36, 3.0% C38, 2.3% C40, 1.5% C42, 1.2% C44, 0.8% C46, 0.4% C48, and 0.3% C50 by weight.

Unilin425 is an aliphatic C14-C56 alcohol blend purchased from Baker Hughes, which includes typically 1.7% C14, 3.3% C16, 4.6% C18, 6.0% C20, 7.2% C22, 7.9% C24, 8.5% C26, 8.6% C28, 8.5% C30, 8.1% C32, 7.4% C34, 6.4% C36, 5.6% C38, 4.5% C40, 3.4% C42, 2.7% C44, 2.1% C46, 1.3% C48, 1.1% C50, 0.7% C52, 0.4% C54, and 0.2% C56 by weight.

In the following Examples 1-11, 11 different esterified olefin-maleic anhydride copolymers were prepared from different olefins and/or alcohols by a process as described hereinafter, respectively.

In Example 1, Maleic Anhydride (64.9 g), 1-dodecene (122.7 g), and Aromatic 150 (a solvent purchased from Exxon Mobile, 80 g) were added to a reactor and stirred by an agitator. The reactor headspace was inerted by vacuumizing the reactor headspace and back-charging the vacuumized headspace with nitrogen. The reactor was heated to about 150° C. During the heating process, a Dicumyl Peroxide solution was prepared by dissolving Dicumyl Peroxide (5.4 g) in Aromatic 150 (9.3 g) and the Dicumyl Peroxide solution was inerted by nitrogen. When the reactor temperature reached 150° C., the Dicumyl Peroxide solution was added into the reactor continuously over a period of 3.5 hours, and the reactor temperature was then held at 150° C. for additional 2.5 hours. After the total 6 hours of reaction, a mixture of NAFOL20+ (129.2 g), NAFOL24+ (152.4 g), ISOFOL24 (23.5 g), and Dodecylbenzenesulfonic Acid (12.6 g) at about 80° C. was added into the reactor in one portion. Then the reactor temperature was held at 150° C. for another 12 hours with a dean-stark equipped on the reactor to collect water generated from the esterification. The resulting product was labeled EXP-1 for test and evaluation as described hereinafter.

In Example 2, NAFOL2428 (157.4 g) was used to replace the NAFOL24+ and ISOFOL24 in Example 1. The resulting product was labeled EXP-2.

In Example 3, 1-Decene (102.3 g) was used to replace the 1-Dodecene in Example 1. The resulting product was labeled EXP-3.

In Example 4, 1-Tetradecene (143.2 g) was used to replace the 1-Dodecene in Example 1. The resulting product was labeled EXP-4.

In Example 5, 58.8 g ISOFOL24 was used instead of the 23.5 g ISOFOL24 in Example 1. The resulting product was labeled EXP-5.

In Example 6, 117.6 g ISOFOL24 was used instead of the 23.5 g ISOFOL24 in Example 1. The resulting product was labeled EXP-6.

In Example 7, 235.1 g ISOFOL24 was used instead of the 23.5 g ISOFOL24 in Example 1. The resulting product was labeled EXP-7.

In Example 8, 35.8 g Benzyl alcohol was used instead of the 23.5 g ISOFOL24 in Example 1. The resulting product was labeled EXP-8.

In Example 9, 35.6 g Oleyl alcohol was used instead of the 23.5 g ISOFOL24 in Example 1. The resulting product was labeled EXP-9.

In Example 10, Unilin350 (304.8 g) was used to replace the alcohols in Example 1. The resulting product was labeled EXP-10.

In Example 11, 362.8 g Unilin425 and 235.1 g ISOFOL24 were used to replace the alcohols in Example 1. The resulting product was labeled EXP-11.

The composition of olefins and alcohol mixtures used for Examples 1-11 are summarized in Table 1, in which the amounts of the alcohols are denoted as mole percentages with respect to the amount of the Maleic Anhydride employed. Each of the alcohol mixtures has an average number of carbon atoms in the range from 20 to 32.

TABLE 1

| | | Alcohol Mixture Composition | | |
|---|---|---|---|---|
| Products | Olefin | Alcohol 1 | Alcohol 2 | Alcohol 3 |
| EXP-1 | 1-dodecene | 50 mol % NAFOL20+ | 50 mol % NAFOL24+ | 10 mol % ISOFOL24 |
| EXP-2 | 1-dodecene | 50 mol % NAFOL20+ | 50 mol % NAFOL2428 | none |
| EXP-3 | 1-decene | 50 mol % NAFOL20+ | 50 mol % NAFOL24+ | 10 mol % ISOFOL24 |
| EXP-4 | 1-tetradecene | 50 mol % NAFOL20+ | 50 mol % NAFOL24+ | 10 mol % ISOFOL24 |
| EXP-5 | 1-dodecene | 50 mol % NAFOL20+ | 50 mol % NAFOL24+ | 25 mol % ISOFOL24 |
| EXP-6 | 1-dodecene | 50 mol % NAFOL20+ | 50 mol % NAFOL24+ | 50 mol % ISOFOL24 |
| EXP-7 | 1-dodecene | 50 mol % NAFOL20+ | 50 mol % NAFOL24+ | 100 mol % ISOFOL 24 |
| EXP-8 | 1-dodecene | 50 mol % NAFOL20+ | 50 mol % NAFOL24+ | 50 mol % benzyl alcohol |
| EXP-9 | 1-dodecene | 50 mol % NAFOL20+ | 50 mol % NAFOL24+ | 20 mol % oleyl alcohol |
| EXP-11 | 1-dodecene | 100 mol % Unilin350 | none | none |
| EXP-12 | 1-dodecene | 100 mol % Unilin425 | none | 100 mol % ISOFOL24 |

Example 12

In Example 12, the resulting products obtained from Examples 1-11 were evaluated as potential wax inhibitors against comparative additive A (labeled A) and B (labeled B) through cold finger, cold centrifuge, and high-pressure low-temperature viscosity tests. The comparative additive A has a hydrocarbyl side chain containing 18-26 carbon atoms and an ester side chain containing 20-32 carbon atoms. The comparative additive B has a hydrocarbyl side chain containing 10 carbon atoms and an ester side chain containing 14-20 carbon atoms.

Cold centrifuge test was used as an accelerated test to evaluate low temperature stability of the comparative additives A and B and the experimental products EXP-1 to EXP-11 (samples) on a Beckman Coulter centrifuge with TA-10-250 fixed angle rotor at 4° C./800 rpm for 6 hours. Samples were diluted in xylene or Aromatic 150 (A150) to 20 wt %, 15 wt % or 10 wt % for cold centrifuge test, all samples were filtered through 0.7 μm nylon or 1 μm glass-fibre filter before the test. A sample should stay as a clear solution without phase separation after the 6 hours' centrifuge to pass the test. Test results of the samples are summarized in Table 2.

TABLE 2

| | Cold centrifuge test | | |
|---|---|---|---|
| Samples | 15 wt % in xylene | 20 wt % in xylene | 15 wt % in A150 |
| A | fail | fail | fail |
| B | pass | pass | pass |
| EXP-1 | pass | pass | pass |
| EXP-2 | pass | fail | pass |
| EXP-3 | pass | pass | pass |
| EXP-4 | pass | ND (not tested) | pass |
| EXP-5 | pass | pass | pass |
| EXP-6 | pass | pass | pass |
| EXP-7 | pass | pass | pass |
| EXP-8 | pass | fail | ND |
| EXP-9 | pass | fail | ND |
| EXP-10 | pass | fail | pass |
| EXP-11 | pass | fail | pass |

As shown in the results listed above in Table 2, the comparative additive B and all the experimental products EXP-1 to EXP-11 pass at least the test with 15% solution in xylene, which indicates they have good low temperature stability.

Example 13

Wax deposition inhibitions of these samples were evaluated on PSL CF-15 cold finger following industrial standard cold finger testing protocol, using Model Oil A (Exxon Mobile D60s and A150 blends provided with about 5 wt % Wako44 wax and 5 wt % Wako68 wax) and Model Oil B (a China non-waxy crude provided with about 5 wt % Wako44 wax and 5 wt % Wako68 wax) as simulated crude oil. Test results of these samples are summarized in Table 3.

TABLE 3

| | Cold finger test deposition inhibition rate | |
|---|---|---|
| Samples | | Model Oil A | Model Oil B |
| | Active dosage (ppm) | 200 | 400 |
| | Heating temperature (° C.) | 37 | 43 |
| | Finger temperature (° C.) | 25 | 28 |
| | Test time (hour) | 4 | 18 |
| A | | 88% | 84% |
| B | | 14% | 3% |
| EXP-1 | | 87% | 87% |
| EXP-2 | | 88% | 90% |
| EXP-3 | | 85% | 83% |
| EXP-4 | | 86% | 85% |
| EXP-5 | | 85% | 80% |
| EXP-6 | | 83% | 70% |
| EXP-7 | | 78% | 52% |

TABLE 3-continued

Cold finger test deposition inhibition rate

| Samples | Model Oil A | Model Oil B |
|---|---|---|
| EXP-8 | 85% | 81% |
| EXP-9 | 86% | 82% |
| EXP-10 | 85% | 77% |
| EXP-11 | 83% | 74% |

As can be seen from Table 3, the experimental products EXP-1 to EXP-11 have much higher wax deposition inhibition rates for the Model Oil A and B than the comparative additive B.

Example 14

High pressure low temperature viscosity test was used to evaluate stability of the experimental products EXP-1 and EXP-2 at high pressure and low temperature as part of their deepwater qualification. The tests were performed on high pressure rheology meter. EXP-1 and EXP-2 were diluted in xylene to 15 wt % for cold centrifuge test, and were filtered through 0.7 µm nylon or 1 µm glassfibre filter before the test. Their test results are summarized in Table 4.

TABLE 4

| | | Viscosity (cp) | |
|---|---|---|---|
| Pressure (psi) | Temperature (° C.) | EXP-1 15 wt % in xylene | EXP-2 15 wt % in xylene |
| 14.7 | 4 | 4.13 | 3.596 |
| 2500 | 4 | 4.77 | 4.316 |
| 5000 | 4 | 5.57 | 6.063 |
| 7500 | 4 | 8.96 | 10.34 |
| 10000 | 4 | 21.72 | 22.67 |
| 12500 | 4 | 47.38 | 47.64 |
| 15000 | 4 | 293 | 500 |

High pressure low temperature viscosity test is the major test for upstream chemical deepwater qualification. A deepwater qualified product should keep <100 cp viscosity at the certain pressure and 4° C. In the results listed above in Table 4, both the experimental products EXP-1 and EXP-2 pass the test at 12,500 psi with 15 wt % solution in xylene, which indicated they have good stability at high pressure and low temperature.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An oil composition comprising an oil and an effective amount of a wax inhibitor that comprises:
    at least one modified alpha-olefin maleic anhydride copolymer of the formula:

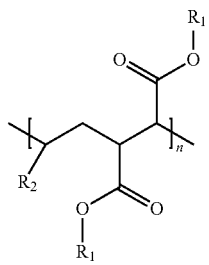

wherein R1 is selected from hydrogen or hydrocarbyl groups containing 12-60 carbon atoms, wherein the hydrocarbyl groups include a combination of straight-chain and at least one of branched-chain, cyclic alkyl, alkenyl, alkynyl and aryl groups, and an average carbon atom number of R1, if not hydrogen, in the copolymer is in a range from 20 to 32, R2 is selected from hydrocarbyl groups containing 6-12 carbon atoms, and n is a number of repeating units ranging from 1 to 100, and wherein R1, if not hydrogen, has a longer hydrocarbyl chain than R2.

2. The oil composition of claim 1, wherein R1 is selected from hydrogen or C12-C60 saturated or unsaturated substituted, or unsubstituted alkyl groups.

3. The oil composition of claim 1, wherein R2 is selected from C6-C12 saturated or unsaturated substituted, or unsubstituted alkyl groups.

4. The oil composition of claim 1, wherein the wax inhibitor is prepared by reacting an alpha-olefin containing from 8 to 14 carbon atoms with maleic anhydride in the presence of a free radical initiator to obtain a copolymer, followed by reacting said copolymer with an alcohol mixture with an average number of carbon atoms in a range from 20 to 32 and comprising at least one C12-C60 alcohol blend and at least one bulky alcohol selected from the group consisting of guerbet alcohols, benzyl alcohols, oleyl alcohols, tertiary alcohols and trimethylsilanol.

5. The oil composition of claim 4, wherein more than 30% by weight of alcohols in the alcohol mixture are C22+ alcohols that contain at least 22 carbon atoms.

6. The oil composition of claim 1, wherein a weight percentage of the wax inhibitor in the oil composition is in a range from 0.0001% to 1%.

7. The composition of claim 4, wherein the alpha-olefin is selected from the group consisting of: 1-octene, 1-decene, 1-dodecene and 1-tetradecene.

8. The oil composition of claim 4, wherein the bulky alcohol is a guerbet alcohol comprising 2-decyl-1-tetradecanol.

9. A method of reducing wax deposition from an oil, the method comprising adding to said oil an effective amount of a wax inhibitor that comprises at least one modified alpha-olefin maleic anhydride copolymer of the formula:

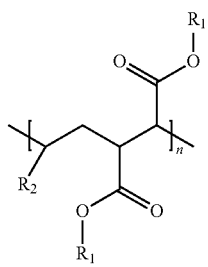

wherein R1 is selected from hydrogen or hydrocarbyl groups containing 12-60 carbon atoms, wherein the hydrocarbyl groups include a combination of straight-chain and at least one of branched-chain, cyclic alkyl, alkenyl, alkynyl and aryl groups, and an average carbon atom number of R1, if not hydrogen, in the copolymer is in a range from 20 to 32, R2 is selected from hydrocarbyl groups containing 6-12 carbon atoms, and n is a number of repeating units ranging from 1 to 100, and wherein R1, if not hydrogen, has a longer hydrocarbyl chain than R2.

10. An oil composition comprising an oil and an effective amount of a wax inhibitor, said wax inhibitor prepared by reacting an alpha-olefin containing from 8 to 14 carbon atoms with maleic anhydride in the presence of a free radical initiator to obtain a copolymer having a hydrocarbyl side chain containing 6 to 12 carbon atoms, followed by reacting said copolymer with an alcohol mixture with an average number of carbon atoms in a range from 20 to 32 to form a copolymer having an ester side chain, wherein the ester side chain is longer than the hydrocarbyl side chain, and wherein the alcohol mixture comprises at least one C12-C60 alcohol blend and at least one bulky alcohol selected from the group consisting of guerbet alcohols, benzyl alcohols, oleyl alcohols, tertiary alcohols and trimethylsilanol.

11. The composition of claim 10, wherein the alpha-olefin is selected from the group consisting of: 1-octene, 1-decene, 1-dodecene and 1-tetradecene.

12. The oil composition of claim 10, wherein the bulky alcohol is a guerbet alcohol comprising 2-decyl-1-tetradecanol.

13. A method of reducing wax deposition from an oil, the method comprising adding to said oil an effective amount of a wax inhibitor, said wax inhibitor prepared by reacting an alpha-olefin containing from 8 to 14 carbon atoms with maleic anhydride in the presence of a free radical initiator to obtain a copolymer having a hydrocarbyl side chain containing 6 to 12 carbon atoms, followed by reacting said copolymer with an alcohol mixture with an average number of carbon atoms in a range from 20 to 32 to form a copolymer having an ester side chain, wherein the ester side chain is longer than the hydrocarbyl side chain, and wherein the alcohol mixture comprises at least one C12-C60 alcohol blend and at least one bulky alcohol selected from the group consisting of guerbet alcohols, benzyl alcohols, oleyl alcohols, tertiary alcohols and trimethylsilanol.

* * * * *